United States Patent
Tesner et al.

(10) Patent No.: US 8,701,848 B2
(45) Date of Patent: Apr. 22, 2014

(54) SLEEVE DAMPER ASSEMBLY

(75) Inventors: Kenneth C. Tesner, Macomb, MI (US); Turgay Bengisu, West Bloomfield, MI (US); Michael Duva, Howell, MI (US)

(73) Assignee: GM Global Technology Operations, Detroit, MI (US)

( * ) Notice: Subject to any disclaimer, the term of this patent is extended or adjusted under 35 U.S.C. 154(b) by 310 days.

(21) Appl. No.: 13/074,517

(22) Filed: Mar. 29, 2011

(65) Prior Publication Data

US 2012/0247896 A1   Oct. 4, 2012

(51) Int. Cl.
 *F16F 7/10* (2006.01)
(52) U.S. Cl.
 USPC .......................................................... 188/379
(58) Field of Classification Search
 USPC ......... 188/378, 379, 380; 174/42; 16/2.1, 2.2, 16/2.3, 2.5; 138/151, 156, 158; 181/207; 267/136
 See application file for complete search history.

(56) References Cited

U.S. PATENT DOCUMENTS

| | | | | |
|---|---|---|---|---|
| 3,705,445 A | * | 12/1972 | Smollinger | 403/268 |
| 3,829,184 A | * | 8/1974 | Chevret | 384/280 |
| 4,004,766 A | * | 1/1977 | Long | 248/55 |
| 4,043,432 A | * | 8/1977 | Scheldorf | 188/379 |
| 4,858,738 A | * | 8/1989 | Novoa | 188/378 |
| 5,090,668 A | * | 2/1992 | Hamada | 267/141 |
| 5,313,780 A | * | 5/1994 | Williams et al. | 60/39.08 |
| 5,950,970 A | * | 9/1999 | Methany et al. | 248/150 |
| 6,029,509 A | * | 2/2000 | Singarella et al. | 73/114.56 |
| 6,412,586 B1 | * | 7/2002 | Askew | 180/309 |
| 6,485,370 B1 | * | 11/2002 | Kurosu et al. | 464/180 |
| 7,398,616 B1 | * | 7/2008 | Weir | 42/73 |
| 2004/0149532 A1 | * | 8/2004 | Beigang | 188/379 |
| 2005/0247366 A1 | * | 11/2005 | Tyrer et al. | 138/157 |
| 2007/0209496 A1 | * | 9/2007 | Lenzi | 84/313 |
| 2010/0247856 A1 | * | 9/2010 | Vito et al. | 428/138 |
| 2013/0000073 A1 | * | 1/2013 | Canic et al. | 16/2.2 |

FOREIGN PATENT DOCUMENTS

| | | | | |
|---|---|---|---|---|
| JP | 02221731 A | * | 9/1990 | F16F 15/12 |
| JP | 2008215445 A | * | 9/2008 | |

* cited by examiner

*Primary Examiner* — Robert A Siconolfi
*Assistant Examiner* — Charles Poon

(57) ABSTRACT

A damper for a linear element of a motor vehicle drivetrain such as a cable, a transmission oil fill tube or an engine oil dipstick tube constitutes a loose fitting sleeve or annulus disposed about the linear component. The damper may be positioned on a substantially vertical tube by a stop which may be any device such as a sleeve of material having an outside diameter larger than the inside diameter of the damper that is clamped or secured to the tube. Alternatively, the damper may be of sufficient length that one end may be clamped to the tube while the other end, which loosely fits on the tube, acts as a damper. The damper may be fabricated of a material such as closed cell foam or other relatively lightweight, resilient and compressible material.

12 Claims, 2 Drawing Sheets

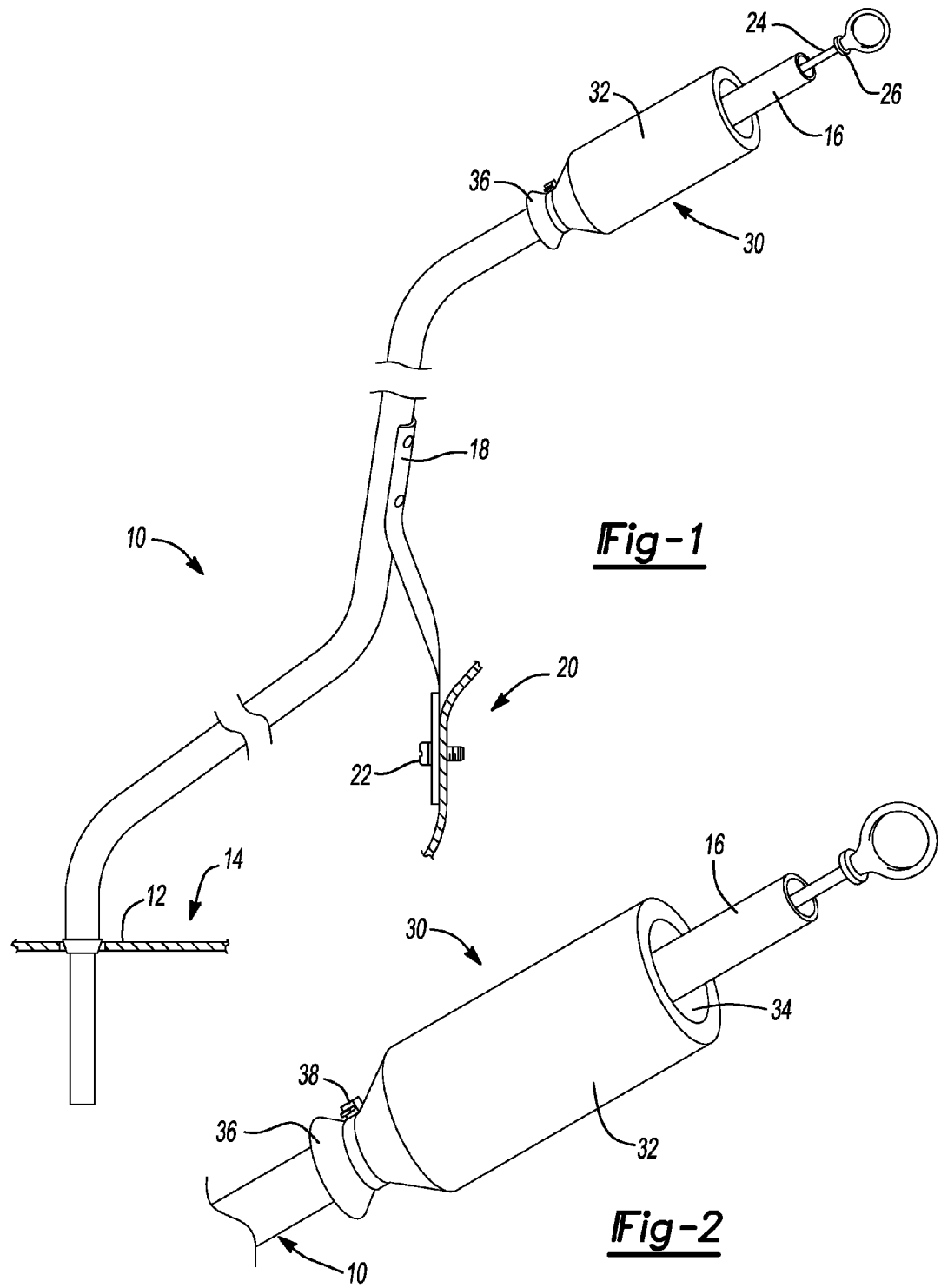

SLEEVE DAMPER ASSEMBLY

FIELD

The present disclosure relates to damper assemblies and more particularly to sleeve damper assemblies for damping sympathetic vibrations in motor vehicle engine components.

BACKGROUND

The statements in this section merely provide background information related to the present disclosure and may or may not constitute prior art.

The impact of unwanted, sympathetic vibration or resonances of elements in mechanical systems ranges from inconsequential, through annoying and service life limiting to problematic and catastrophic. Certainly the extent or magnitude of such sympathetic vibration plays a role in locating a particular activity along the foregoing spectrum. Additionally, the type of product, i.e., whether it is a refrigerator, an air compressor, an electric generator, a motor vehicle powertrain, an airplane or a suspension bridge determines whether the vibration is a nuisance, the source of consumer complaints or a safety issue.

The most complex consumer products, at least from a mechanical standpoint, are clearly motor vehicles. With thousands of components, frequent new and re-designed mechanical components, an emphasis on weight reduction, lengthy service lives and vehicle service and care ranging from virtually total neglect to careful and complete, sympathetic vibration or resonance of components is a constant and constantly addressed engineering issue.

In motor vehicles, the drive or powertrain tends to be the situs of most sympathetic vibration problems and thus the focus of the most attention. A common area of difficulty typically involves a linear component, such as a cable or tubing, that extends unsupported between two points. The most difficult problems arise when a linear element includes an unsupported length that is free standing, such as a transmission oil fill tube or engine oil dipstick tube.

Various solutions have been heretofore proposed. Perhaps the most common involves strengthening the linear element. Such a solution adds to the weight and cost of the component and it still may be subject to sympathetic vibration or resonance—just at a different frequency. Adding additional braces or points of attachment is also a common solution but, once again, it not only adds weight and cost but also increases the time and cost of assembly.

The present invention is directed to reducing or eliminating sympathetic vibration of linear components in mechanical systems such as vehicle powertrains.

SUMMARY

The present invention provides a damper assembly for a linear element of a motor vehicle such as a cable, tube, transmission oil fill tube or engine oil dipstick tube. A first embodiment of the damper assembly constitutes a loose fitting sleeve or annulus disposed about a linear component such as a cable, a cooler pipe or line, a transmission oil fill tube or engine dipstick tube. The sleeve damper assembly may be positioned on a substantially vertical tube by a stop which may be any device such as a sleeve of material having an outside diameter larger than the inside diameter of the damper that is clamped or secured to the tube. In a second embodiment, the damper sleeve is of sufficient length that one end may be clamped to the tube while the other end, which loosely fits on the tube, acts as a damper. The damper sleeve may be fabricated of a material such as closed cell foam or other relatively lightweight, resilient and compressible material. The damper moves or "rattles" in random, chaotic manner to absorb energy and interfere with and thus minimize or eliminate resonance or harmonic vibration of the associated linear element.

Thus it is an aspect of the present invention to provide a damper assembly for a linear mechanical element such as a cable, a cooler pipe or line, a transmission fill tube or an engine dipstick tube.

It is a further aspect of the present invention to provide a damper sleeve which fits loosely about a linear mechanical element.

It is a still further aspect of the present invention to provide a damper sleeve having at least a portion which fits loosely about a linear mechanical element.

It is a still further aspect of the present invention to provide a damper assembly which moves or "rattles" in a random, chaotic manner.

It is a still further aspect of the present invention to provide a damper assembly which absorbs energy and interferes with and thus minimizes or eliminates unwanted harmonic vibration of an associated mechanical element.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a perspective view of a transmission fill tube having a first embodiment of a sleeve damper assembly according to the present invention installed thereon;

FIG. 2 is an enlarged, fragmentary, perspective view of a first embodiment of a sleeve damper assembly according to the present invention on a transmission fill tube;

DETAILED DESCRIPTION

Figures 3, 4:
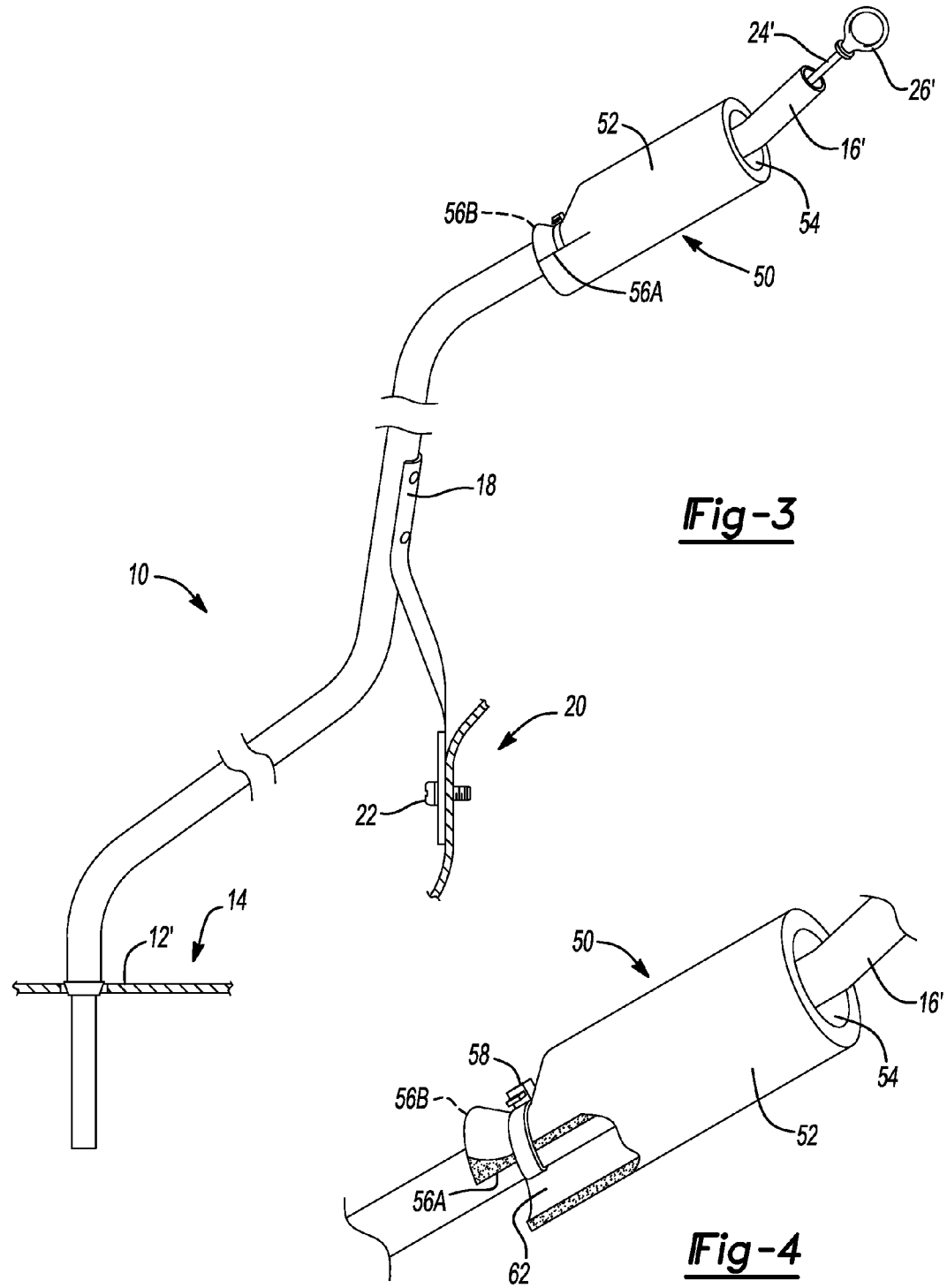
FIG. 3 is a perspective view of a transmission fill tube having a second embodiment of a sleeve damper assembly according to the present invention installed thereon.
FIG. 4 is an enlarged, fragmentary, perspective view of a second embodiment of a sleeve damper assembly according to the present invention on a transmission fill tube.

The following description is merely exemplary in nature and is not intended to limit the present disclosure, application, or uses.

With reference to FIG. 1, a transmission fill tube upon which a sleeve damper assembly according to the present invention is mounted is illustrated and generally designated by the reference number 10. The transmission fill tube 10 is typically an elongate, hollow tube that is secured to and extends upwardly from a transmission housing 12. The transmission housing 12 receives, locates and protects various components (not illustrated) of the transmission 14. The transmission fill tube 10 is typically between one foot and four feet in length (30.5 cm. to 122 cm.) in a typical passenger car, light truck or sport utility vehicle and extends from the transmission housing 12 upwardly to a location of convenient access within the engine compartment to a terminus 16. Depending upon the length of the transmission fill tube 10, it may include one or more brackets or straps 18 which are secured or attached to the transmission housing 12 and/or an engine 20 by, for example, suitable fasteners such as bolts or machine screws 22. The transmission fill tube 12 facilitates addition of transmission fluid (not illustrated) to the transmission 14 as needed. In addition to facilitating addition of fluid to the transmission 14, the transmission fill tube 10 receives a removable flexible, typically flat shaft or dipstick 24 that facilitates determining the level of fluid in the transmission 14. The dipstick 24 preferably includes a top seal, cap or grommet 26 that closes off the terminus 16 of the transmission fill tube 10.

A significant portion of the transmission fill tube 10, especially that portion most distant from the transmission housing 12 and adjacent the terminus 16, may be unsupported. As noted above, such unsupported lengths of a tubular, elongate component such as the transmission fill tube 10 may permit or encourage resonance or sympathetic vibration of the component.

Referring now to FIGS. 1 and 2, a first embodiment of a sleeve damper assembly according to the present invention is illustrated and generally designated by the reference number 30. The sleeve damper assembly 30 is typically and preferably installed on an unsupported portion of the transmission fill tube 10. The sleeve damper assembly 30 includes a tubular damper sleeve 32 which defines a through, axial passageway 34. The damper sleeve 32 is preferably fabricated of conventional closed cell polyurethane foam satisfying ASTM D1056 2D2 and having a UL 94 V-O coating. Other relatively lightweight, softly resilient materials such as foam rubber and materials having different densities are also suitable.

The damper sleeve 32 is preferably between about 3 inches (76.2 mm.) to 6 inches (152.4 mm.) in length, preferably has a wall thickness of between about 0.20 inches (5.1 mm.) and 0.35 inches (9.0 mm.) and preferably an inside diameter (the diameter of the axial passageway 34) of between 0.75 inches (19.05 mm.) and 1.25 inches (31.75 mm.). Preferably, as well, the outside diameter of the transmission fill tube 10 will be at least one-half of the diameter of the axial passageway 34. The foregoing dimensions are approximate only and it should be understood that they will vary (even outside the stated ranges) depending upon the density of the material of which the damper sleeve 32 is fabricated, the outside diameter of the transmission fill tube 10, the particular frequency or band of frequencies desired to be attenuated by the sleeve damper assembly 30 and other design variables.

Below the damper sleeve 32 and disposed in supporting relationship with it is a fixed collar, stop or support 36. The collar, stop or support 36 has an outer diameter that is slightly larger than the diameter of the axial passageway 34 such that the damper sleeve 32 cannot slide along or down the transmission fill tube 10 beyond the location at which the upper edge of the collar, stop or support 36 engages the lower edge of the damper sleeve 32. The stop or support 36 may be of any suitable material such as the closed cell foam described above or other reasonably durable and lightweight material. If fabricated of closed cell foam or other, similar resilient material, the stop or support 36 may be readily secured to the transmission fill tube 10 by, for example, a strap, cable tie 38 or a similar tensioning device. Alternatively, a suitable adhesive may be utilized.

Referring now to FIG. 3, a second embodiment of a sleeve damper assembly according to the present invention is illustrated and generally designated by the reference number 50. The second embodiment of the sleeve damper assembly 50 is shown in place on a transmission fill tube 10'. The transmission fill tube 10' extends from a transmission housing 12' and may include one or more mounting brackets or straps 18'. Typically, the transmission fill tube 10' receives a removable flexible, typically flat shaft or dipstick 24' that facilitates determining the level of fluid in the transmission 14. The dipstick 24 preferably includes a top seal, cap or grommet 26' that closes off the fill tube 10'. Proximate the upper terminus 16' of the transmission fill tube 10', typically in an unsupported region, is disposed the sleeve damper assembly 50. The sleeve damper assembly 50 includes a single, elongate tubular damper sleeve 52 which defines a through, axial passageway 54. The damper sleeve 52 is preferably fabricated of conventional closed cell polyurethane foam satisfying ASTM D1056 2D2 and having a UL 94 V-O coating. Other softly resilient materials such as foam rubber and materials having different densities are also suitable.

The damper sleeve 52 is preferably between about 4 inches (101.6 mm.) to 7 inches (177.8 mm.) in length, preferably has a wall thickness of between about 0.20 inches (5.1 mm.) and 0.35 inches (9.0 mm.) and preferably an inside diameter (the diameter of the axial passageway 54) of between 0.75 inches (19.05 mm.) and 1.25 inches (31.75 mm.). Preferably, as well, the outside diameter of the transmission fill tube 10' will be at least one-half of the diameter of the axial passageway 54. The foregoing dimensions are approximate only and it should be understood that they will vary (even outside the stated ranges) depending upon the density of the material of which the damper sleeve 52 is fabricated, the outside diameter of the transmission fill tube 10', the particular frequency or band of frequencies desired to be attenuated by the sleeve damper assembly 50 and other design variables.

Referring now to FIGS. 3 and 4, the damper sleeve 52 includes a pair of radially aligned, that is, diametrically opposed, axially extending cuts or slits 56A and 56B at the lower end of the damper sleeve 52, that is, the end most distant from the terminus 16' of the transmission fill tube 10'. The damper sleeve 52 is preferably disposed on the transmission fill tube 10' with the cuts or slits 56A and 56B aligned horizontally. Threaded through the cuts or slits 56A and 56B, around the lower half of the transmission fill tube 10' and over the upper, outside surface of the damper sleeve 52 is a strap or cable tie 58 or similar tensioning or securement device. Positioning the strap or cable tie 58 proximate one end of the damper sleeve 52 (the lower end) allows a maximum length of the damper sleeve 52 to move and vibrate to interfere with and cancel out vibrations and to absorb energy. Fastening the cable tie 58 around the lower half of the transmission fill tube 10' and the upper surface of the damper sleeve 52 maintains an open region 62 within and at the lower portion of the axial passageway 54 to allow dirt and debris to pass through the damper sleeve 52 and thereby prevent the accumulation of dirt and debris within the axial passageway 54 of the damper sleeve 52 which would interfere with its operation.

In operation, both the first embodiment of the sleeve damper assembly 30 and the second embodiment of the sleeve damper assembly 50 function in essentially the same way: as untuned, i.e., chaotic, dampers or energy absorbing and dissipating devices to damp unwanted resonances or sympathetic vibrations in unsupported portions of linear elements such as cables, and engine and transmission fill tubes in motor vehicles. Thus, they be readily and easily fitted about and secured to such elements and, without extensive tuning and matching of source and damper fundamental and harmonic frequencies, they function as untuned, chaotic dampers to attenuate the motion of the linear element and to absorb and dissipate vibratory energy over a broad frequency spectrum.

The description of the invention is merely exemplary in nature and variations that do not depart from the gist of the invention are intended to be within the scope of the invention. Such variations are not to be regarded as a departure from the spirit and scope of the invention.

What is claimed is:

1. A vibration damper assembly for a non-rotating linear component comprising, in combination,
    an elongate tubular sleeve fabricated of closed cell foam, said tubular sleeve defining an axial passageway and a pair of opposed axially extending slits at one end of said sleeve, and
    a strap extending through said slits in said tubular sleeve and around said linear component for retaining said tubular sleeve on said linear component.

2. The vibration damper assembly of claim 1 wherein said linear component is subject to vibratory excitation.

3. The vibration damper assembly of claim 1 wherein said tubular sleeve has a length of seven inches or less.

4. The vibration damper assembly of claim 1 wherein said closed cell foam is polyurethane.

5. The vibration damper assembly of claim 1 wherein said tubular sleeve has an inside diameter larger than a diameter of said linear component.

6. A sleeve damper assembly for reducing resonance of a non-rotating linear element comprising, in combination,
    an elongate circular damper sleeve fabricated of plastic foam, including a pair of opposed slits at one end and defining an axial through passageway adapted to receive said linear element, and
    a retaining strap extending between and through said slits and around said linear element and a portion of said damper sleeve for securing said damper sleeve to said linear element.

7. The sleeve damper assembly of claim 6 wherein said axial through passageway has a diameter larger than a diameter of said linear element.

8. The sleeve damper assembly of claim 6 wherein said linear element is a transmission fill tube.

9. The sleeve damper assembly of claim 6 wherein said circular damper sleeve has a length of seven inches or less.

10. The sleeve damper assembly of claim 6 wherein said plastic foam is closed cell polyurethane.

11. The sleeve damper assembly of claim 6 wherein said linear element is an engine dipstick tube.

12. The vibration damper assembly of claim 1 wherein a diameter of said linear component is at least half a diameter of said axial passageway.

* * * * *